United States Patent [19]

Eppley

[11] Patent Number: 5,506,395
[45] Date of Patent: Apr. 9, 1996

[54] MULTI-ACCESS CARD AND CARD HOLDER WITH A PLURALITY OF MACHINE READABLE SERVICE ACCESS CODES PLACED THEREON

[75] Inventor: William C. Eppley, 529 Kent La., Carmel, Ind. 46032

[73] Assignee: William C. Eppley, Carmel, Ind.

[21] Appl. No.: 263,513

[22] Filed: Jun. 22, 1994

[51] Int. Cl.[6] ........................................... G06K 7/08
[52] U.S. Cl. ..................... 235/486; 235/449; 150/147; 206/39
[58] Field of Search ........................... 150/145, 147; 206/39; 235/449, 486

[56] References Cited

U.S. PATENT DOCUMENTS

| | | | |
|---|---|---|---|
| 4,711,347 | 12/1987 | Drexler et al. | 150/147 X |
| 4,834,552 | 5/1989 | Makowka | 383/5 |
| 5,288,942 | 2/1994 | Godfrey | 150/147 X |
| 5,326,964 | 7/1994 | Risser | 235/486 X |

FOREIGN PATENT DOCUMENTS 2629613  10/1989  France .

OTHER PUBLICATIONS

2–sided sales brochure entitled "ID Card Made for Companies, Organizations, and Clubs Consultation Upon Request," Iris Ltd., Inc., Blandon, Pa.
Sales Brochure of The Iris Companies, Blandon, Pa.

Primary Examiner—John Shepperd
Assistant Examiner—Michael G. Lee
Attorney, Agent, or Firm—Clifford W. Browning; Woodard, Emhardt, Naughton, Moriarty & McNett

[57] ABSTRACT

A multi-access card and card holder upon which the machine readable service access codes for a plurality of service providers may be reproduced, comprising at least one card having a plurality of machine readable service access codes reproduced thereon, including at least one machine readable magnetic strip, and a plurality of pockets each formed from a pair of rectangularly-shaped plastic sheets peripherally joined together along three sides thereof, each having one common peripheral joinder, and each having an open end to receive the card, at least one of the pockets being sized to receive only the portions of the card that do not have a machine readable magnetic strip service access code placed thereon.

10 Claims, 5 Drawing Sheets

5,506,395

MULTI-ACCESS CARD AND CARD HOLDER WITH A PLURALITY OF MACHINE READABLE SERVICE ACCESS CODES PLACED THEREON

BACKGROUND OF THE INVENTION

The present invention relates generally to small cards, generically referred to as "credit cards," that bear the machine readable magnetic strips or bar codes by which cardholders gain access to a wide variety of cardholder services, including, but not limited to, network banking, electronic checking, debits and credit for purchases, and the electronic application of specials, discount coupons, samples, contests, sweepstakes, and the like. More particularly, the present invention relates to a multi-access card and card holder that, when combined, permit the service access codes of numerous service providers to be combined in one credit-card-sized device, thereby replacing a plurality of individual cards that carry just one machine readable service access code.

SUMMARY OF THE INVENTION

The multi-access card and card holder of the preferred embodiments of the present invention allow a cardholder to combine in one credit-card-sized device a plurality of different machine readable service access codes, such as magnetic strips and Universal Product Codes (UPC) or other machine readable bar codes. This is accomplished by duplicating onto at least one multi-access card, and in one preferred embodiment upon the card holder itself, the service access codes of the cardholder's favorite service retailers, thereby replacing a plurality of existing customer service and/or "credit cards" with the multi-access card and card holder of the present invention. In this manner, a plurality of different service access codes can be combined on the multi-access card and card holder of the present invention, thereby replacing four to six, or more, individual cards that would otherwise be carried by cardholders now to access the same services.

One preferred embodiment of the present invention is a multi-access card and card holder upon which the machine readable service access codes for a plurality of service providers may be reproduced, comprising: at least one card having a plurality of machine readable service access codes reproduced thereon, including at least one machine readable magnetic strip; a plurality of pockets each formed from a pair of rectangularly-shaped plastic sheets peripherally joined together along three sides thereof, each having one common peripheral joinder, and each having an open end to receive the card, at least one of the pockets being sized to receive only the portions of the card that do not have a machine readable magnetic strip service access code placed thereon.

Another preferred embodiment of the present invention is a multi-access card and card holder upon which the machine readable service access codes for a plurality of service providers may be reproduced, comprising: at least one card having a plurality of machine readable service access codes reproduced thereon, including at least one machine readable magnetic strip; a plurality of pockets each formed from a pair of rectangularly-shaped plastic sheets peripherally joined together along three sides thereof, each having one common peripheral joinder, and each having an open end to receive the card, at least one of the pockets having at least one machine readable service access code placed thereon and at least one other of the pockets being sized to receive only the portions of the card that do not have a machine readable magnetic strip service access code placed thereon.

Yet another preferred embodiment of the present invention is a card holder for multi-access cards that have the machine readable service access codes for a plurality of service providers reproduced thereon, including at least one machine readable magnetic strip, comprising: a plurality of pockets each formed from a pair of rectangularly-shaped plastic sheets peripherally joined together along three sides thereof, each having one common peripheral joinder, and each having an open end to receive a multi-access card, and at least one of the pockets being sized to receive only tile portions of a multi-access card that do not have a machine readable magnetic strip service access code placed thereon.

Yet another preferred embodiment of the present invention is a multi-access card holder upon which the machine readable service access codes for a plurality of service providers may be reproduced, comprising: at least one pocket formed from a pair of rectangularly-shaped plastic sheets peripherally joined together along three sides thereof leaving an open end to receive an identification card, and a plurality of machine readable service access codes placed on the pocket.

It is a principal object of the present invention to provide at least one multi-access card and a card holder that will permit a cardholder to combine a plurality of different sets of machine readable service access codes in a single device, thereby replacing a plurality of individual access cards that would otherwise be carried by a cardholder to access the same services.

Related objects and advantages will be evident from the following detailed description.

DESCRIPTION OF THE PREFERRED EMBODIMENTS

Figure 1:
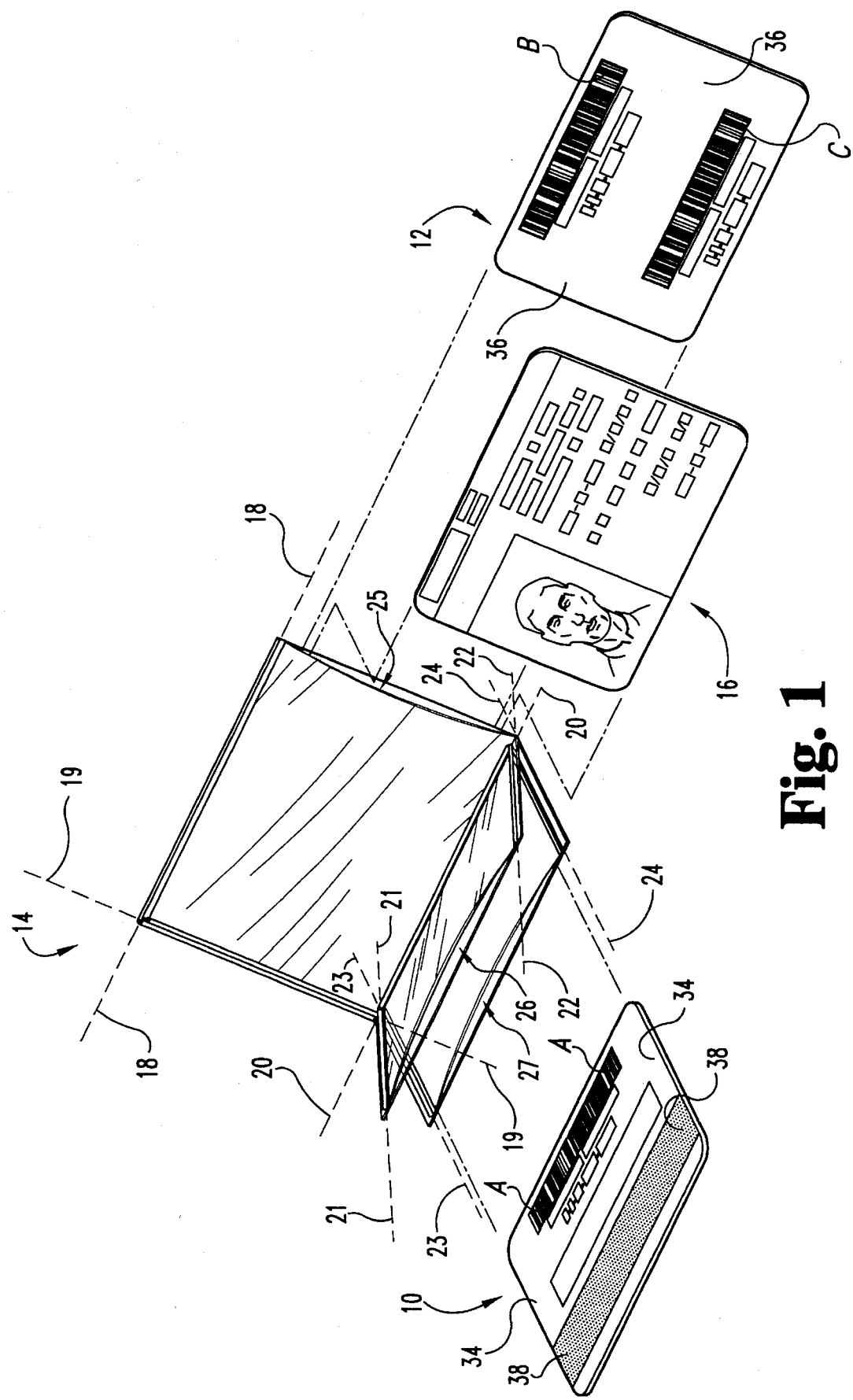
FIG. 1 is an exploded top perspective view of a preferred embodiment of the multi-access card and card holder of the present invention, illustrated with multi-access cards 10 and 12 and card holder 14 shown in an open position, and a common driver's license 16 with picture identification for illustration purposes, only.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated devices, and such further applications of the principles of the invention as illustrated therein being contemplated as would normally occur to one skilled in the art to which the invention relates.

Referring now to the drawings, FIG. 1 is an exploded top perspective view of a preferred embodiment of the multi-access card and card holder of the present invention, illustrated with two multi-access cards 10 and 12, and a card holder 14, and with a driver's license 16 with a photo identification for illustration purposes, only. Card holder 14 is shown in a substantially open position in FIG. 1.

Still referring to FIG. 1, in tile preferred embodiment illustrated therein, card holder 14 consists of three pockets 25, 26, and 27, each of which is constructed from a pair of rectangularly-shaped plastic sheets, each having a thickness of approximately 0.008", which are peripherally joined together along three sides thereof such that each of the pockets has an open end and each shares a common peripheral joinder. The pairs of plastic sheets are joined together by conventional welding techniques along lines 18—18, 19—19, and 20—20 to form pocket 25; along lines 21—21, 22—22, and 20—20 to form pocket 26; and along lines lines 23—23, 24—24, and 20—20 to form pocket 27. All three pockets 25, 26, and 27 share a common joinder along line 20—20. Line 20—20 is a peripheral side joinder for pocket 25 and a peripheral bottom joinder for pockets 26 and 27. Any number of additional pockets may be constructed in like manner from additional pairs of rectangularly-shaped plastic sheets, each sharing a common joinder along line 20—20. Alternatively, fewer pockets may be provided than illustrated in FIG. 1, depending upon the type and number of multi-access cards that are to be carried in the card holder 14, as will be further explained below.

The pliable nature of the plastic sheets that form the pockets allows the pockets to pivot about their common joinder along line 20—20 in fan-like fashion. Sleeves 25, 26, and 27 of the preferred embodiment may therefore be folded together in an overlapping relationship (not shown) to allow storage of the card holder 14 in a conventional purse or wallet. Because line 20—20 is a peripheral side joinder for pocket 25 and a peripheral bottom joinder for pockets 26 and 27, when these pockets are overlaid, the overall peripheral dimensions of the card holder 14 would then approximate the overall dimensions of other "credit cards" that are carried in the conventional purse or wallet.

Figure 3:
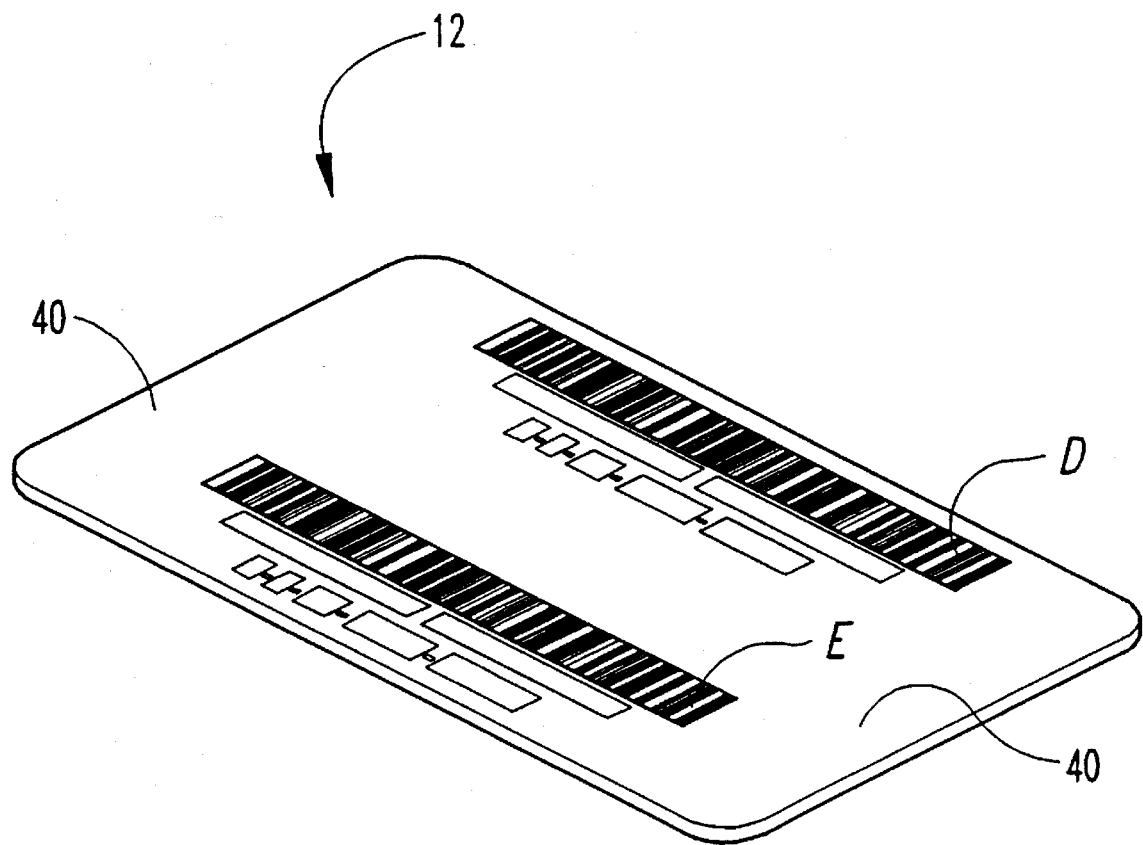
FIG. 3 is a bottom perspective view of the multi-access card 12 of FIG. 1.

In the preferred embodiments to date, the surfaces of multi-access cards 10 and 12 are opaque. On these opaque surfaces, a plurality of machine readable bar codes, such as the Universal Product Code (UPC) now in common usage, or the commonly used machine readable magnetic strips, may be placed. Referring again to FIG. 1, the top surface 34 of multi-access card 10 is illustrated with one UPC code A and one machine readable magnetic strip 38. Magnetic strip 38 is positioned on multi-access card 10 such that magnetic strip 38 will be read when multi-access card 10 is swiped in the conventional manner through a conventional magnetic strip reader. The bottom surface of multi-access card 10 (not shown) may also be provided with UPC codes, configured, for example, as are the UPC codes B and C on the top surface 36 of multi-access card 12 (FIG. 1), or as are UPC codes D and E on the bottom surface 40 of multi-access card 12 (FIG. 3).

Multi-access cards 10 and 12 have perimeter dimensions of approximately 3.375"×2.125", which are the approximate perimeter dimensions of the generic "credit card" now in universal use, as well as the common driver's license 16. Multi-access card 10 is preferably about 0.036" thick, which approximates the thickness of the generic "credit card," so that it will pass through a standard magnetic strip reader, which has a minimum thickness requirement of 0.030".

Figure 2:
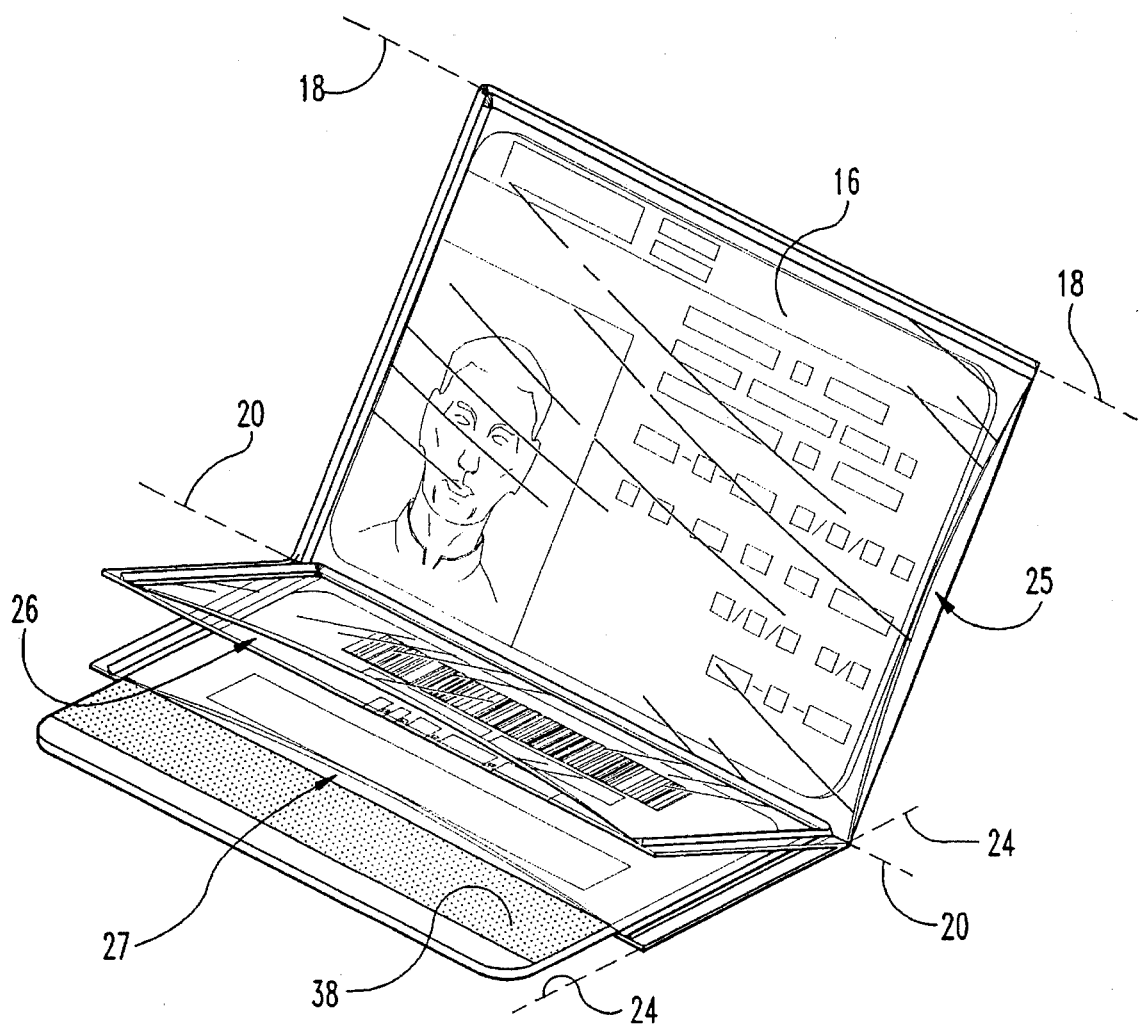
FIG. 2 is a top perspective view of the multi-access card and card holder of FIG. 1, assembled.
Figure 4:
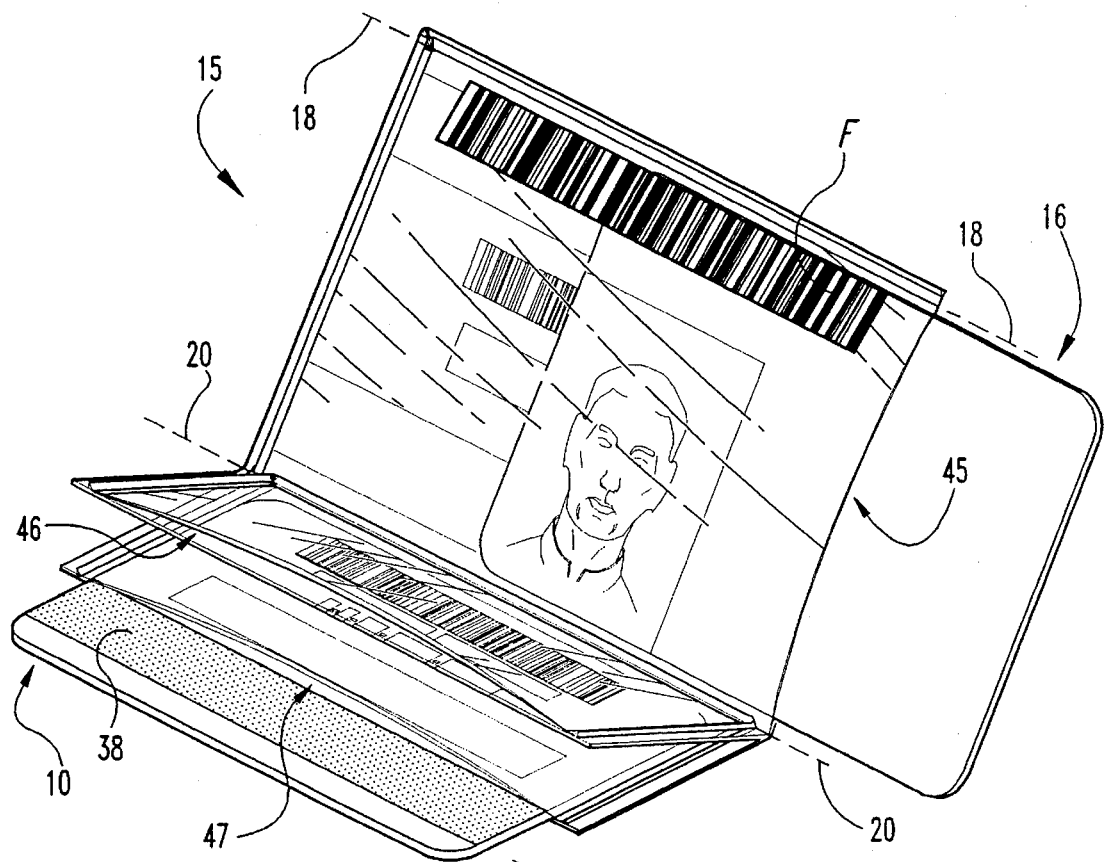
FIG. 4 is a partially exploded top perspective view of an equally preferred embodiment of the multi-access card and card holder of the present invention, illustrated with multi-access card 10 and card holder 18 shown in an open position, and a common driver's license 16 with picture identification for illustration purposes, only.
Figure 5:
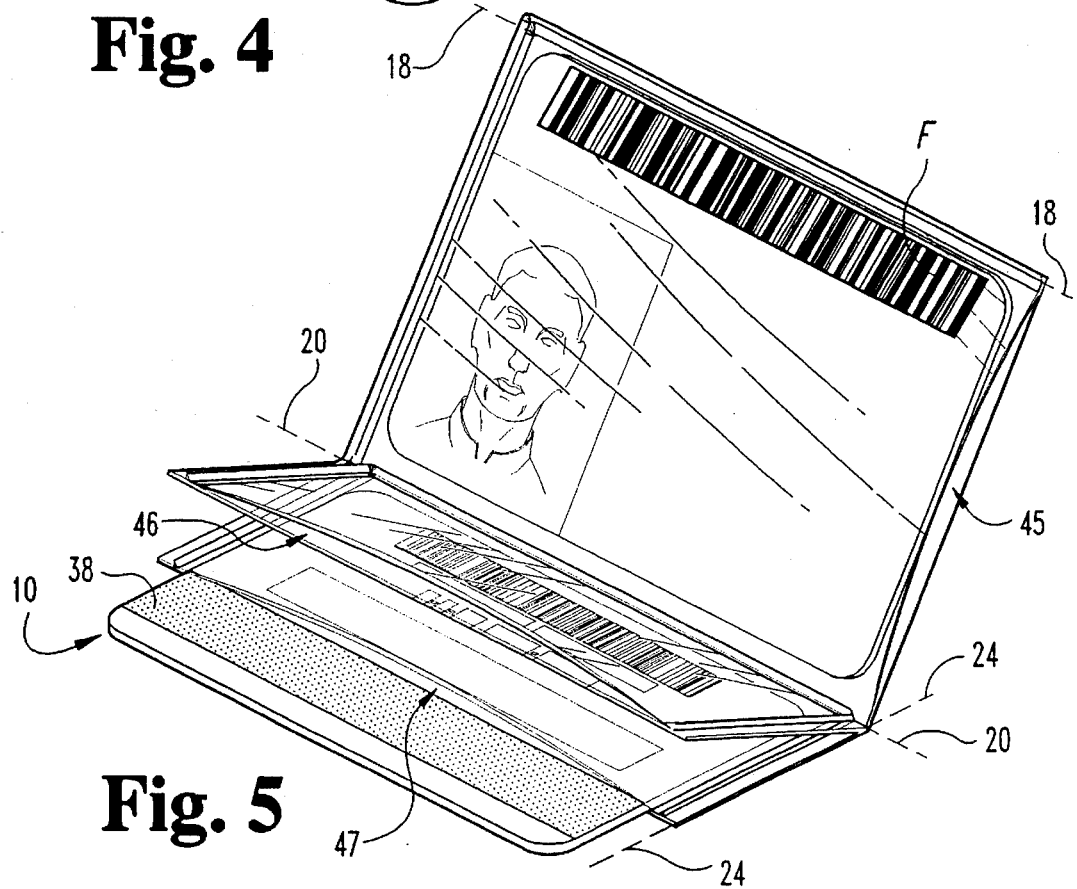
FIG. 5 is a top perspective view of the multi-access card and card holder of FIG. 4, assembled.

Pockets 27 and 26 are constructed smaller in overall size than pocket 25 such that when multi-access card 10 is fully inserted into either pocket 26 or 27 in the manner illustrated in FIGS. 1 and 2, multi-access card 10 is tightly held within these pockets by frictional forces, and will not fall out, and such that the magnetic strip 38 on the top surface 34 of multi-access card 10 is not covered by either of the pair of plastic sheets that form pockets 26 or 27 (FIGS. 2, 4, and 5). In the preferred embodiments to date, the close tolerance in pockets 27 and 26 that allows multi-access card 10 to be held therein by frictional forces has been accomplished by increasing the width of the conventional weld along lines 21—21, 22—22, 23—23, and 24—24 during construction to thereby decrease the width of the pockets 26 and 27 to the approximate width of multi-access card 10. If the multi-access card 10 and holder 14 is presented to a magnetic strip reader in the configuration of FIG. 2, the magnetic strip 38 could be freely swiped in the conventional manner through a conventional magnetic strip reader and read without interference from the pair of plastic sheets that form pocket 27.

If pockets 26 and 25 are then folded out of the way, UPC code A on the top surface of 34 of multi-access card 10 could be presented to a bar code reader, which would read UPC code A correctly, even through the plastic sheet that forms pocket 27. Similarly, any UPC codes on the bottom surface of multi-access card 10 could be presented to a bar code reader and read through the plastic sheet that forms pocket 27.

In like manner, pocket 26, and any number of additional pockets of like construction, could be provided to receive a multi-access card of similar construction to that of multi-access card 10, each having a machine readable magnetic strip on a surface thereof.

Referring again to FIG. 1, pocket 25 is sized to receive fully a multi-access card 12, which does not have a machine readable magnetic strip, and a picture identification, such as the common driver's license illustrated in FIG. 1. If a picture identification was not desired, all the UPC codes printed on both sides of multi-access card 12 would be visible through the plastic sheets that form pocket 25 (FIGS. 1 and 3). A hand placed over all but one of the UPC codes that would be exposed on either side of multi-access card 12 when received within pocket 25 would allow the remaining UPC code to be read by a UPC code reader if multi-access card 12 and holder 14 were presented to a UPC code reader in the configuration illustrated in FIGS. 2.

Referring now to FIGS. 4–7, there is illustrated an equally preferred alternate embodiment of the multi-access card and card holder of the present invention, illustrated with multi-access card 10 and card holder 15, and with a common driver's license 16 for illustration purposes, only. Card holder 15 is shown in a substantially open position in FIGS. 4 and 5.

Figure 6:
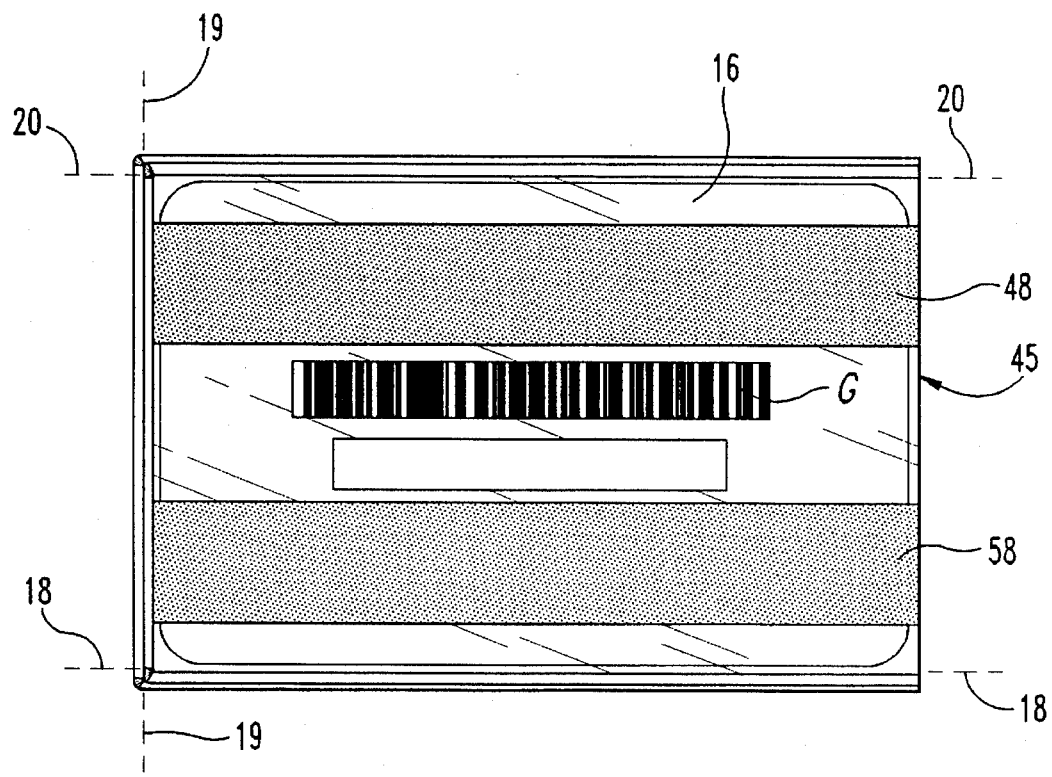
FIG. 6 is a rear view of the multi-access card and card holder of FIG. 5.
Figure 7:
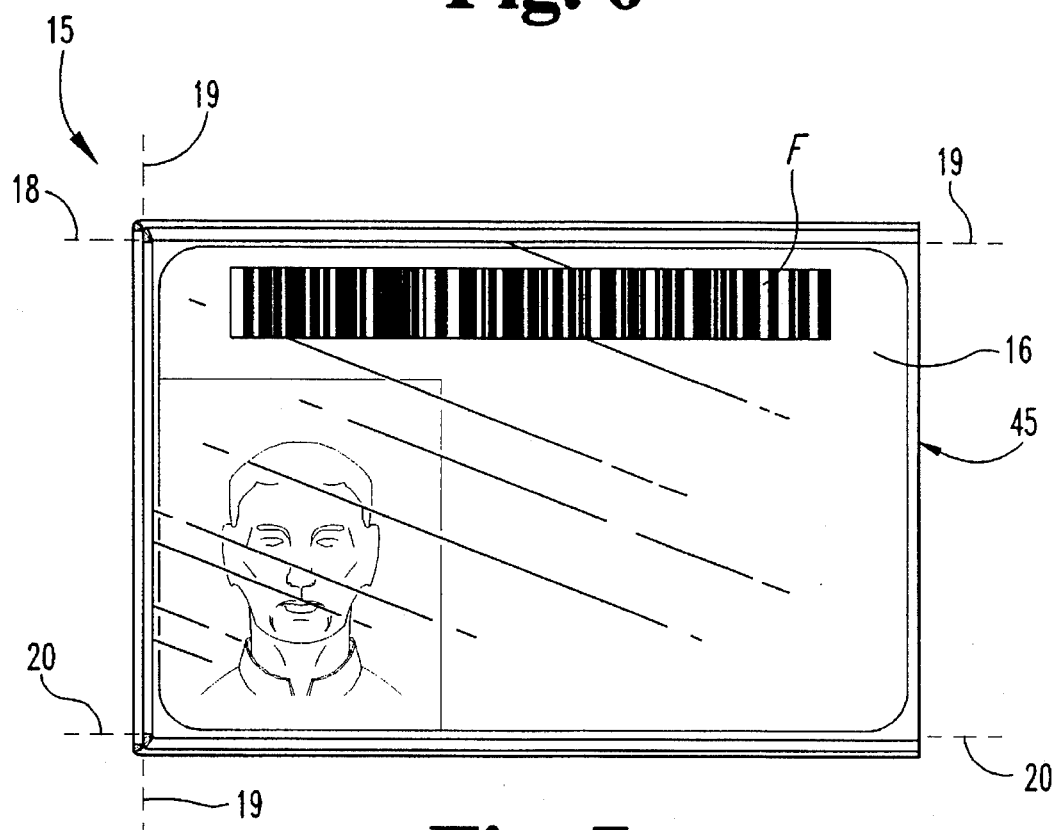
FIG. 7 is a front, and partially segmented view, of the multi-access card and card holder of FIG. 6

Card holder 15 of this alternate preferred embodiment is constructed in the same manner as is card holder 14 to form three pockets 45, 46 and 47. The principal difference between card holder 14 and card holder 15 of this alternate preferred embodiment is that pocket 45 of card holder 15 has UPC codes and machine readable magnetic strips printed and placed by conventional means directly upon the pair of plastic sheets that form pocket 45 in lieu of inserting a multi-access card 12, or the like, therein. Referring now to FIGS. 4, 5 and 7, the front of pocket 45 has a UPC code F printed thereon in a position that would not cover a picture identification, such as a common driver's license, placed within pocket 45. Referring now to FIG. 6, the back side of pocket 45 has a pair of machine readable magnetic strips 48 and 58 placed thereon, each positioned on pocket 45 such that magnetic strips 48 and 58 will be read when pocket 45 is swiped in the conventional manner through a conventional magnetic strip reader, provided any picture identification placed in pocket 45 expands the thickness of the pocket beyond the minimum thickness requirements of the conventional magnetic strip reader. There is also room for a UPC code G, which is also printed directly upon the back of pocket 45.

Alternatively, as illustrated in FIGS. 6 and 7, pockets 46 and 47 could be removed from card holder 15 if no other multi-access cards 10 bearing magnetic strips were to be carried in the card holder 15.

Referring now to FIGS. 1 and 6, in addition to machine readable magnetic strips and UPC codes, the opaque surfaces of the multi-access cards 10 and 12 and the back of pocket 45 may be printed with other identifying information. For example, the trade names or service marks and number codes of the service vendors and the personal identification number(s) of the cardholder associated with the magnetic strips and each of the UPC codes A–G illustrated in the FIGS., may be reproduced within the exemplary rectangular boxes that are juxtaposed with the magnetic strips and the UPC codes in tile FIGS. In addition, other identification data for the cardholder that is in any form of card-sized picture identification may be inserted into pocket 25 of card holder 12 or pocket 45 of card holder 15. Special medical information, or other like personal information relating to the cardholder, may also be placed on the opaque surfaces of multi-access cards 10 and 12 or directly on the pockets themselves.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A multi-access card and card holder upon which machine readable service access codes for a plurality of service providers may be reproduced, comprising:

at least one card having a plurality of machine readable service access codes reproduced thereon, including at least one machine readable magnetic strip;

a plurality of pockets each formed from a pair of rectangularly-shaped plastic sheets peripherally joined together along three sides thereof, each having one common peripheral joinder, and each having an open end to receive said card, at least one of said pockets being sized to receive only the portions of said card that do not have a machine readable magnetic strip service access code placed thereon.

2. The multi-access card and card holder of claim 1 wherein said pair of plastic sheets are joined together such that at least one of said pockets has a peripheral side joinder in common with a peripheral bottom joinder of at least one other of said pockets.

3. The multi-access card and card holder of claim 1 wherein there are at least two of said cards and one of said cards has a machine readable magnetic strip service access code placed thereon.

4. A multi-access card and card holder upon which machine readable service access codes for a plurality of service providers may be reproduced, comprising:

at least one card having a plurality of machine readable service access codes reproduced thereon, including at least one machine readable magnetic strip;

a plurality of pockets each formed from a pair of rectangularly-shaped plastic sheets peripherally joined together along three sides thereof, each having one common peripheral joinder, and each having an open end to receive said card, at least one of said pockets having at least one machine readable service access code placed thereon and at least one other of said pockets being sized to receive only the portions of said card that do not have a machine readable magnetic strip service access code placed thereon.

5. The multi-access card and card holder of claim 4 wherein said pair of plastic sheets are joined together such that at least one of said pockets has a peripheral side joinder in common with a peripheral bottom joinder of at least one other of said pockets.

6. The multi-access card and card holder of claim 4 wherein there are at least two of said cards and one of said cards has a machine readable magnetic strip service access code placed thereon.

7. A card holder for multi-access cards that have machine readable service access codes for a plurality of service providers reproduced thereon, including at least one machine readable magnetic strip, comprising:

a plurality of pockets each formed from a pair of rectangularly-shaped plastic sheets peripherally joined together along three sides thereof, each having one common peripheral joinder, and each having an open end to receive a multi-access card, and at least one of said pockets being sized to receive only the portions of a multi-access card that do not have a machine readable magnetic strip placed thereon.

8. The multi-access card and card holder of claim 7 wherein said pair of plastic sheets are joined together such that at least one of said pockets has a peripheral side joinder in common with a peripheral bottom joinder of at least one other of said pockets.

9. A multi-access card holder upon which machine readable service access codes for a plurality of service providers are reproduced, comprising:

at least one pocket formed from a pair of rectangularly-shaped plastic sheets peripherally joined together along three sides thereof leaving an open end to receive an identification card, and a plurality of machine readable service access codes on said pocket.

10. The multi-access card holder of claim 9 wherein said plurality of machine readable service access codes includes at least one machine readable magnetic strip and one machine readable bar code.

* * * * *

UNITED STATES PATENT AND TRADEMARK OFFICE
CERTIFICATE OF CORRECTION

PATENT NO. : 5,506,395
DATED : April 9, 1996
INVENTOR(S) : William C. Eppley

It is certified that error appears in the above-identified patent and that said Letters Patent is hereby corrected as shown below:

In column 2, line 13, please delete "tile" and insert in lieu thereof --the--.

In column 3, line 14, please delete "tile" and insert in lieu thereof --the--.

In column 5, line 31, please delete "tile" and insert in lieu thereof --the--.

Signed and Sealed this

Sixteenth Day of July, 1996

Attest:

BRUCE LEHMAN

Attesting Officer     Commissioner of Patents and Trademarks